3,151,024
S-[2-(N-OXY)PYRIDYL] THIOLCARBONATES
John J. D'Amico, Charleston, W. Va., and Anton G. Weiss, Basel, Switzerland, assignors to Monsanto Chemical Company, St. Louis, Mo., a corporation of Delaware
No Drawing. Filed Apr. 18, 1963, Ser. No. 273,856
15 Claims. (Cl. 167—33)

This invention relates to new organic compounds useful as biological toxicants and to methods for their preparation. The new compounds are S-[2-(N-oxy)pyridyl] thiolcarbonates of the following general formula:

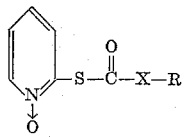

wherein R is an alkyl, aryl or aralkyl radical such as methyl, ethyl, propyl, butyl, phenyl or benzyl, and X is oxygen or sulfur.

Examples of the new compounds comprise methyl S-[2-(N-oxy)pyridyl] thiolcarbonate, ethyl S-[2-(N-oxy)pyridyl] thiolcarbonate, propyl S-[2-(N-oxy)pyridyl] thiolcarbonate, isopropyl S-[2-(N-oxy)pyridyl] thiolcarbonate, butyl S-[2-(N-oxy)pyridyl] thiolcarbonate, sec.-butyl S-[2-(N-oxy)pyridyl] thiolcarbonate, isobutyl S-[2-(N-oxy)pyridyl] thiolcarbonate, tert.-butyl S-[2-(N-oxy)pyridyl] thiolcarbonate, amyl S-[2-(N-oxy)pyridyl] thiolcarbonate, sec.-amyl S-[2-(N-oxy)pyridyl] thiolcarbonate, tert.-amyl S-[2-(N-oxy)pyridyl] thiolcarbonate, hexyl S-[2-(N-oxy)pyridyl] thiolcarbonate, 1,3-dimethylbutyl S-[2-(N-oxy)pyridyl] thiolcarbonate, heptyl S-[2-(N-oxy)pyridyl] thiolcarbonate, octyl S-[2-(N-oxy)pyridyl] thiolcarbonate, 2-ethylhexyl S-[2-(N-oxy)pyridyl] thiolcarbonate, nonyl S-[2-(N-oxy)pyridyl] thiolcarbonate, decyl S-[2-(N-oxy)pyridyl] thiolcarbonate, undecyl S-[2-(N-oxy)pyridyl] thiolcarbonate, dodecyl S-[2-(N-oxy)pyridyl] thiolcarbonate, benzyl S-[2-(N-oxy)pyridyl] thiolcarbonate, phenyl S-[2-(N-oxy)pyridyl] thiolcarbonate, o-chlorophenyl S-[2-(N-oxy)pyridyl] thiolcarbonate, p-chlorophenyl S-[2-(N-oxy)pyridyl] thiolcarbonate, m-chlorophenyl S-[2-(N-oxy)pyridyl] thiolcarbonate, m-bromophenyl S-[2-(N-oxy)pyridyl] thiolcarbonate, o-bromophenyl S-[2-(N-oxy)pyridyl] thiolcarbonate, p-bromophenyl S-[2-(N-oxy)pyridyl] thiolcarbonate, 2,4-dibromophenyl S-[2-(N-oxy)pyridyl] thiolcarbonate, 2,4-dichlorophenyl S-[2-(N-oxy)pyridyl] thiolcarbonate, 2,6-dichlorophenyl S-[2-(N-oxy)pyridyl] thiolcarbonate, 2,3,6-trichlorophenyl S-[2-(N-oxy)pyridyl] thiolcarbonate, 2,4,5-trichlorophenyl S-[2-(N-oxy)pyridyl] thiolcarbonate, 2,4,5,6-tetrachlorophenyl S-[2-(N-oxy)pyridyl] thiolcarbonate, 2,3,5,6-tetrachloro-p-nitrophenyl S-[2-(N-oxy)pyridyl] thiolcarbonate, pentachlorophenyl S-[2-(N-oxy)pyridyl] thiolcarbonate, methyl S-[2-(N-oxy)pyridyl] dithiolcarbonate, ethyl S-[2-(N-oxy)pyridyl] dithiolcarbonate, propyl S-[2-(N-oxy)pyridyl] dithiolcarbonate, isopropyl S-[2-(N-oxy)pyridyl] dithiolcarbonate, butyl S-[2-(N-oxy)pyridyl] dithiolcarbonate, sec.-butyl S-[2-(N-oxy)pyridyl] dithiolcarbonate, isobutyl S-[2-(N-oxy)pyridyl] dithiolcarbonate, tert.-butyl S-[2-(N-oxy)pyridyl] dithiolcarbonate, amyl S-[2-(N-oxy)pyridyl] dithiolcarbonate, sec.-amyl S-[2-(N-oxy)pyridyl] dithiolcarbonate, tert.-amyl S-[2-(N-oxy)pyridyl] dithiolcarbonate, hexyl S-[2-(N-oxy)pyridyl] dithiolcarbonate, 1,3-dimethylbutyl S-[2-(N-oxy)pyridyl] dithiolcarbonate, heptyl S-[2-(N-oxy)pyridyl] dithiolcarbonate, octyl S-[2-(N-oxy)pyridyl] dithiolcarbonate, 2-ethylhexyl S-[2-(N-oxy)pyridyl] dithiolcarbonate, nonyl S-[2-(N-oxy)pyridyl] dithiolcarbonate, decyl S-[2-(N-oxy)pyridyl] dithiolcarbonate, undecyl S-[2-(N-oxy)pyridyl] dithiolcarbonate, dodecyl S-[2-(N-oxy)pyridyl] dithiolcarbonate, benzyl S-[2-(N-oxy)pyridyl] dithiolcarbonate, phenyl S-[2-(N-oxy)pyridyl] dithiolcarbonate, o-chlorophenyl S-[2-(N-oxy)pyridyl] dithiolcarbonate, p-chlorophenyl S-[2-(N-oxy)pyridyl] dithiolcarbonate, m-chlorophenyl S-[2-(N-oxy)pyridyl] dithiolcarbonate, m-bromophenyl S-[2-(N-oxy)pyridyl] dithiolcarbonate, o-bromophenyl S-[2-(N-oxy)pyridyl] dithiolcarbonate, p-bromophenyl S-[2-(N-oxy)pyridyl] dithiolcarbonate, 2,4-dibromophenyl S-[2-(N-oxy)pyridyl] dithiolcarbonate, 2,4-dichlorophenyl S-[2-(N-oxy)pyridyl] dithiolcarbonate, 2,6-dichlorophenyl S-[2-(N-oxy)pyridyl] dithiolcarbonate, 2,3,6-trichlorophenyl S-[2-(N-oxy)pyridyl] dithiolcarbonate, 2,4,5-trichlorophenyl S-[2-(N-oxy)pyridyl] dithiolcarbonate, 2,4,5,6-tetrachlorophenyl S-[2-(N-oxy)pyridyl] dithiolcarbonate, 2,3,5,6-tetrachloro-p-nitrophenyl S-[2-(N-oxy)pyridyl] dithiolcarbonate and pentachlorophenyl S-[2-(N-oxy)pyridyl] dithiolcarbonate.

The alkyl S-[2-(N-oxy)pyridyl] thiolcarbonates and the alkyl S-[2-(N-oxy)pyridyl] dithiolcarbonates are generally free flowing, dark, undistillable oils rarely obtainable in pure form and preferably used in the form of crude technical products.

The invention will be fully understood and apparent from the detailed examples which follow:

*Example 1*

To a stirred slurry comprising 37.2 grams (0.25 mole) of the sodium salt of pyridine 2-thiol, 1-oxide and 150 ml. of acetone was added dropwise 39.1 grams (0.25 mole) of phenyl chloroformate. The stirred reaction mixture was held at 20–25° C. for 4 hours and then 250 ml. of water added. After stirring for 15 minutes, the product was salted out by means of sodium chloride. The product was then extracted with 150 ml. of ether, the top ether layer washed with 50 ml. of water and dried over sodium sulfate. The ether was removed in vacuo at a maximum temperature of 80–90° C./10–12 mm. Phenyl S-[2-(N-oxy)pyridyl] thiolcarbonate was obtained in 61% yield as a dark green oil insoluble in water and heptane, slightly soluble in ether and soluble in acetone, benzene and ethanol. Analysis gave 5.30% nitrogen and 12.05% sulfur compared to 5.67% nitrogen and 12.97% sulfur calculated for $C_{12}H_9NO_3S$. The methyl-, ethyl-, propyl-, isopropyl-, butyl-, amyl and dodecyl S-[2-(N-oxy)pyridyl] thiolcarbonates are also mobile oils of similar solubility characteristics.

*Example 2*

To a stirred slurry comprising 29.9 grams (0.2 mole) of the sodium salt of pyridine 2-thiol, 1-oxide and 300 ml. of acetone was added in one portion at 5° C., 34.6 grams (0.2 mole) of phenyl thiochlorcarbonate. After stirring the mixture at 25–30° C. for 24 hours, 400 ml. of water and 400 ml. of ethyl ether were added and stirring continued for 15 minutes. The top ether layer was separated, washed with water until neutral to litmus and dried over sodium sulfate. The ether was removed in vacuo at a maximum temperature of 80–90° C./1–2 mm. Phenyl S-[2-(N-oxy)pyridyl] dithiolcarbonate was obtained in 57% yield as a black oil insoluble in water and heptane but soluble in ether, acetone, benzene and ethanol. Analysis gave 4.84% nitrogen and 25.86% sulfur compared to 5.32% nitrogen and 24.35% sulfur calculated for $C_{12}H_9NO_2S_2$.

*Example 3*

Replacing phenyl thiochlorcarbonate with an equimolar proportion of ethyl thiochlorcarbonate in the procedure of Example 2, ethyl S-[2-(N-oxy)pyridyl] dithiolcarbonate was obtained in 46.4% yield as a black oil insoluble in water but soluble in heptane, ether, acetone, benzene and ethanol. Analysis gave 6.82% nitrogen compared to 6.51% calculated for $C_8H_9NO_2S_2$. The corresponding methyl-, propyl-, isopropyl-, butyl-, tert.-butyl-, amyl-, octyl- and benzyl S-[2-(N-oxy)pyridyl] dithiolcarbonates were also obtained as dark oils of similar solubility characteristics. The following example illustrates preparation of a higher alkyl derivative.

*Example 4*

To a stirred slurry comprising 29.9 grams (0.2 mole) of the sodium salt of pyridine 2-thiol, 1-oxide, 400 ml. of ethyl ether, 100 ml. of acetone and 20 grams of sodium sulfate was added dropwise in 15 minutes at 5–10° C., 41.8 grams (0.2 mole) of octyl thiochlorcarbonate. The mixture was stirred at 0–10° C. for 2 hours and at 25–30° C. for 24 hours. Thereupon 500 ml. of water were added and the product isolated as in Example 2. Octyl S-[2-(N-oxy)pyridyl] dithiolcarbonate was obtained in 81.5% yield as a black oil insoluble in water but soluble in common organic solvents. Analysis gave 4.58% nitrogen and 23.73% sulfur compared to 4.87% nitrogen and 22.31% sulfur calculated for $C_{13}H_{21}NO_2S_2$.

*Example 5*

In this example an equimolar proportion of p-chlorophenyl thiochlorcarbonate was substituted for the octyl thiochlorcarbonate in Example 4. Addition was dropwise at 5–15° C. After stirring the mixture at 25–30° C. for 24 hours, 500 ml. of water were added and stirring continued for 15 minutes. The precipitate was collected by filtration, washed with water until neutral and air-dried at 25–30° C. p-Chlorophenyl S-[2-(N-oxy)pyridyl] dithiolcarbonate was obtained in 68.2% yield as a green solid melting at 76–78° C. It was insoluble in water, ether and heptane but soluble in hot alcohol, hot ethyl acetate, hot benzene, acetone and chloroform. Analysis gave 4.88% nitrogen, 21.75% sulfur and 13.33% chlorine compared to 4.70% nitrogen, 21.54% sulfur and 11.91% chlorine calculated for $C_{12}H_8ClNO_2S_2$.

The new compounds of this invention are biologically effective and, as will be described more fully hereinafter, they may be compounded according to all common methods for convenience of application in the control of various organisms. The concentration of the compounds for toxicity to living organisms is very small, e.g., from 1 part per 1,000,000 to 1 part by weight in 10,000 by weight of the carrier or vehicle depending upon the organisms being treated and the particular compound of the generic formula which is employed. Higher concentrations may be desirable in some instances. The compounds are especially useful as the active ingredient in toxic quantities in soil-fungicidal compositions. The compounds phenyl S-[2-(N-oxy)pyridyl] thiolcarbonate and p-chlorophenyl S-[2-(N-oxy)pyridyl] dithiolcarbonate, for example, were very effective against *Pythium ultimum* and *Venturia inaequalis*. This is significant because the organisms represent both soil and foliage disease-causing organisms. The compounds are also useful in sanitization compositions, i.e., cleaning compositions which are also toxic to bacteria, e.g., soap bacteriostats and as industrial preservative agents. The compounds may be incorporated into shampoos, as for example tar shampoo, castile olive oil shampoo and shampoo based on tincture of green soap. The compounds may also be incorporated into shampoos and other detergent formulation wherein the active detergent ingredient is a synthetic detergent of the sulfonated anionic type, as for example sodium lauryl sulfoacetate, sodium alkyl aryl polyether sulfonate and sodium dioctyl sulfosuccinate. Cleaning solutions used for cleansing skin of acne patients based on alcohol-acetone-water solutions of soapless skin cleansers, either anionic or nonionic, may advantageously contain one of the new antiseptics. The new compounds possess a desirable solubility profile for use in sanitizing compositions.

The exemplary procedures which illustrate effectiveness as soap bacteriostats consist essentially of adding a stated amount of the compound to a soap solution and preparing serial dilutions of this composition in agar. The agar dilutions are then inoculated with different microbes, incubated at a definite temperature for a definite time after which the dilutions are examined to determine inhibition of growth by the test compound.

*Example 6*

This example shows toxicity of phenyl S-[2-(N-oxy)pyridyl] thiolcarbonate, phenyl S-[2-(N-oxy)pyridyl] dithiolcarbonate and ethyl S-[2-(N-oxy)pyridyl] dithiolcarbonate respectively against *Staphylococcus aureus*. A 1.0% stock solution of the test material prepared in a non toxic solvent was diluted in nutrient agar to provide test samples containing one part of the test material per 100,000 parts of the agar. Petri dishes were respectively filled with the test mixture, and the plates thus prepared were then respectively inoculated with said *Staphylococcus aureus* organism and incubated for 48 hours at 37° C. At the end of that time inspection of the plates showed complete inhibition of growth of the organisms in each instance while identical agar test plates, except that no test material was present, showed normal uninhibited bacterial growth.

*Example 7*

This example shows toxicity of phenyl S-[2-(N-oxy)pyridyl] dithiolcarbonate and ethyl S-[2-(N-oxyl)pyridyl] dithiolcarbonate against *Salmonella typhosa*. A 1.0% stock solution of the test material prepared in a non toxic solvent was diluted in nutrient agar to provide test samples containing one part of the test material per 10,000 parts of the agar. Petri dishes were respectively filled with the test mixture, and the plates thus prepared were then respectively inoculated with said *Salmonella typhosa* organisms and incubated for 48 hours at 37° C. At the end of that time, inspection of the plates showed complete inhibition of growth of the organisms in both instances, while identical agar test plates, except that the test material was not present, showed normal uninhibited bacterial growth.

*Example 8*

This example shows toxicity of phenyl S-[2-(N-oxy)pyridyl] thiolcarbonate against *Salmonella typhosa*. A 1.0% stock solution of the test material prepared in a non toxic solvent was diluted in nutrient agar to provide test samples containing one part of the test material per 100,000 parts of the agar. Petri dishes were respectively filled with the test mixture, and the plates thus prepared were then respectively inoculated with said *Salmonella typhosa* organism and incubated for 48 hours at 37° C. At the end of that time, inspection of the plates showed complete inhibition of growth of the organisms, while identical agar test plates, except that the test material was not present, showed normal uninhibited bacterial growth.

*Example 9*

Ethyl S-[2-(N-oxy)pyridyl] dithiolcarbonate was toxic against the fungus *Aspergillus niger* employing the following testing procedure: A 1.0% stock solution of the test material in a non toxic solvent was made up and this solution was added to sterile, melted dextrose agar in a quantity to give one part of test material per 100,000 parts of agar. After thorough mixing the agar was poured into Petri dishes and allowed to harden. One drop of a spore suspension of the fungus was applied as inoculum for each plate. The inoculated plates were incubated at a temperature of 27° C. for five days. At the end of that time, inspection of the dishes showed complete inhibition of growth of the test fungus while plates not containing test material but otherwise identical and incubated similarly, showed normal uninhibited growth.

*Example 10*

Phenyl S-[2-(N-oxy)pyridyl] thiolcarbonate and phenyl S-[2-(N-oxy)pyridyl] dithiolcarbonate were toxic against the fungus *Aspergillus niger* employing the same testing procedure as in Example 9. Complete inhibition of growth of the test fungus was obtained with one part of the test material per 10,000 parts of agar.

*Example 11*

Phenyl S-[2-(N-oxy)pyridyl] thiolcarbonate, phenyl S-[2-(N-oxy)pyridyl] dithiolcarbonate and p-chlorophenyl S-[2-(N-oxy)pyridyl] dithiolcarbonate protected apple foliage from *Venturia inaequalis*, causative organism of apple scab. A 1.0% stock solution of the test chemical in a non toxic solvent was made up and an aliquot thereof diluted to the desired concentration and applied to the leaves of new growth of apple seedlings. Twenty-four hours later conidia of *Venturia inaequalis* was sprayed on the same foliage. The inoculation was obtained from four isolates of Venturia representing the three races and a wild isolate, all cultured on potato dextrose broth and harvested after four weeks' growth. Spores from all cultures were mixed and the spore load adjusted to 10,000 spores 1 ml. The inoculated plants were then incubated in a greenhouse chamber and disease incidence recorded after 14–20 days' incubation. Perfect control at 10 p.p.m. was observed with all three test chemicals.

*Example 12*

Although it exhibits little phytotoxicity in amounts effective for disease control, ethyl S-[2-(N-oxy)pyridyl] dithiolcarbonate is an effective contact herbicide when applied as a spray in a concentration of 0.5%. It was severely toxic to brome grass, mustard, sugar beets, crab grass, pigweed and moderately phytotoxic to rye grass, foxtail, wild buckwheat, tomato and sorghum. It has little phytotoxicity to plants when applied to soil medium but gave complete control of Pythium at a concentration of 30 p.p.m. as set forth in the following example.

*Example 13*

Three liters of sterilized soil were blended with one liter of a cornmeal-sand culture (two weeks old) of the soil fungus *Pythium ultimum*. The chemicals to be tested were drenched on a soil weight basis over the surface of the soil in portion cups. The treated soil was then incubated at 70° F. in 100% humidity chamber after placing the cups in pans. The pans were wrapped in damp towels before being placed in the incubator. An untreated check was always placed in each pan of cups. After 44 hours fungicidal ratings based on the amount of mycelial growth on the surface of the soil were made. No growth at 30 p.p.m. was observed when the soil was treated with phenyl S-[2-(N-oxy)pyridyl] thiolcarbonate, ethyl S-[2-(N-oxy)pyridyl] dithiocarbonate or p-chlorophenyl S-[2-(N-oxy)pyridyl] dithiolcarbonate.

*Example 14*

This example shows toxicity of phenyl S-[2-(N-oxy)pyridyl] dithiolcarbonate to mosquito larvae. A stock solution or suspension of the test chemical was diluted to the desired concentration. Early fourth instar yellow fever mosquito larvae were placed in a dilute aqueous solution or suspension of the chemical and observed for evidence of toxic action. Mortality observations were taken after 24 hours. Complete kill was observed at 10 p.p.m. of the test chemical. The aforesaid compound as well as octyl S-[2-(N-oxy)pyridyl] dithiolcarbonate and p-chlorophenyl S-[2-(N-oxy)pyridyl] dithiolcarbonate were toxic to *Turbatrix aceti* (vinegar eel worm) at 10 p.p.m.

The foregoing examples demonstrate that the new compounds protect against the destructive effect of microorganisms including both fungi and bacteria. Application of the chemical to the area to be protected, in which area the organism may or may not already be present, in a concentration toxic to such microorganisms affords a high degree of protection. As noted, some of the compounds are useful for destroying insects, nematodes and undesired vegetation. For achieving these various objects it is often advantageous, where the compounds are applied in aqueous medium, to incorporate into the aqueous medium a surface active agent in small amount sufficient to lower the surface tension of the water. Besides water, organic solvents and admixtures thereof, suitable inert carriers include finely divided solids as for example clay and silica. Other active substances such as detergents mentioned above may be present in high proportion and also serve as carriers or simply be added in small proportion to achieve particular objects.

Although preferred radicals for R in the general formula are alkyl of 1–12 carbon atoms inclusive, unsubstituted benzyl, unsubstituted phenyl, chlorophenyl containing 1–5 chlorine atoms inclusive, bromophenyl containing 1–2 bromine atoms inclusive and 2,3,5,6-tetrachloro-p-nitrophenyl, the invention is not limited thereto. Of this group the aryl members are preferred for reasons explained.

It is intended to cover all changes and modifications of the examples of the invention herein chosen for purposes of disclosure which do not constitute departures from the spirit and scope of the invention.

What is claimed is:

1. A compound of the formula

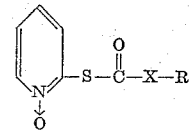

wherein R is selected from the group consisting of alkyl of 1–12 carbon atoms inclusive, benzyl, phenyl, chlorophenyl containing 1–5 chlorine atoms inclusive, bromophenyl containing 1–2 bromine atoms inclusive and 2,3,5,6 - tetrachloro - p - nitrophenyl and wherein X is selected from the group consisting of oxygen and sulfur.

2. Phenyl S-[2-(N-oxy)pyridyl] thiolcarbonate.
3. Phenyl S-[2-(N-oxy)pyridyl] dithiolcarbonate.
4. p - Chlorophenyl S-[2-(N-oxy)pyridyl] dithiolcarbonate.
5. Ethyl S-[2-(N-oxy)pyridyl] dithiolcarbonate.
6. A method of protecting from microorganisms which comprises applying to the area to be protected an amount sufficient to inhibit the growth of microorganisms of a compound of the formula

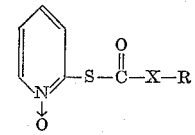

wherein R is selected from the group consisting of alkyl of 1–12 carbon atoms inclusive, benzyl, phenyl, chlorophenyl containing 1–5 carbon atoms inclusive, bromophenyl containing 1–2 bromine atoms inclusive and 2,3,5,6-tetrachloro-p-nitrophenyl and wherein X is selected from the group consisting of oxygen and sulfur.

7. A method of protecting from microorganisms which comprises applying to the area to be protected an amount sufficient to inhibit the growth of microorganisms of phenyl S-[2-(N-oxy)pyridyl] thiolcarbonate.

8. A method of protecting from microorganisms which comprises applying to the area to be protected an amount sufficient to inhibit the growth of microorganisms of phenyl S-[2-(N-oxy)pyridyl] dithiolcarbonate.

9. A method of protecting from microorganisms which comprises applying to the area to be protected an amount sufficient to inhibit the growth of microorganisms of p-chlorophenyl S-[2-(N-oxy)pyridyl] dithiolcarbonate.

10. A method of protecting from microorganisms which comprises applying to the area to be protected an amount sufficient to inhibit the growth of microorganisms of ethyl S-[2-(N-oxy)pyridyl] dithiolcarbonate.

11. A composition effective for inhibiting the growth of microorganisms which comprises a major proportion of carrier, a surface active agent and in an amount sufficient to inhibit the growth of microorganisms a compound of the formula

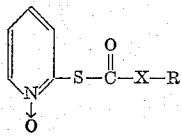

wherein R is selected from the group consisting of alkyl of 1–12 carbon atoms inclusive, benzyl, phenyl, chlorophenyl containing 1–5 chlorine atoms inclusive, bromophenyl containing 1–2 bromine atoms inclusive and 2,3,5,6-tetrachloro-p-nitrophenyl and wherein X is selected from the group consisting of oxygen and sulfur.

12. A composition effective for inhibiting the growth of microorganisms which comprises a major proportion of carrier, a surface active agent and in an amount sufficient to inhibit the growth of microorganisms phenyl S-[2-(N-oxy)pyridyl] thiolcarbonate.

13. A composition effective for inhibiting the growth of microorganisms which comprises a major proportion of carrier, a surface active agent and in an amount sufficient to inhibit the growth of microorganisms phenyl S-[2-(N-oxy)pyridyl] dithiolcarbonate.

14. A composition effective for inhibiting the growth of microorganisms which comprises a major proportion of carrier, a surface active agent and in an amount sufficient to inhibit the growth of microorganisms p-chlorophenyl S-[2-(N-oxy)pyridyl] dithiolcarbonate.

15. A composition effective for inhibiting the growth of microorganisms which comprises a major proportion of carrier, a surface active agent and in an amount sufficient to inhibit the growth of microorganisms ethyl S-[2-(N-oxy)pyridyl] dithiolcarbonate.

No references cited.